UNITED STATES PATENT OFFICE.

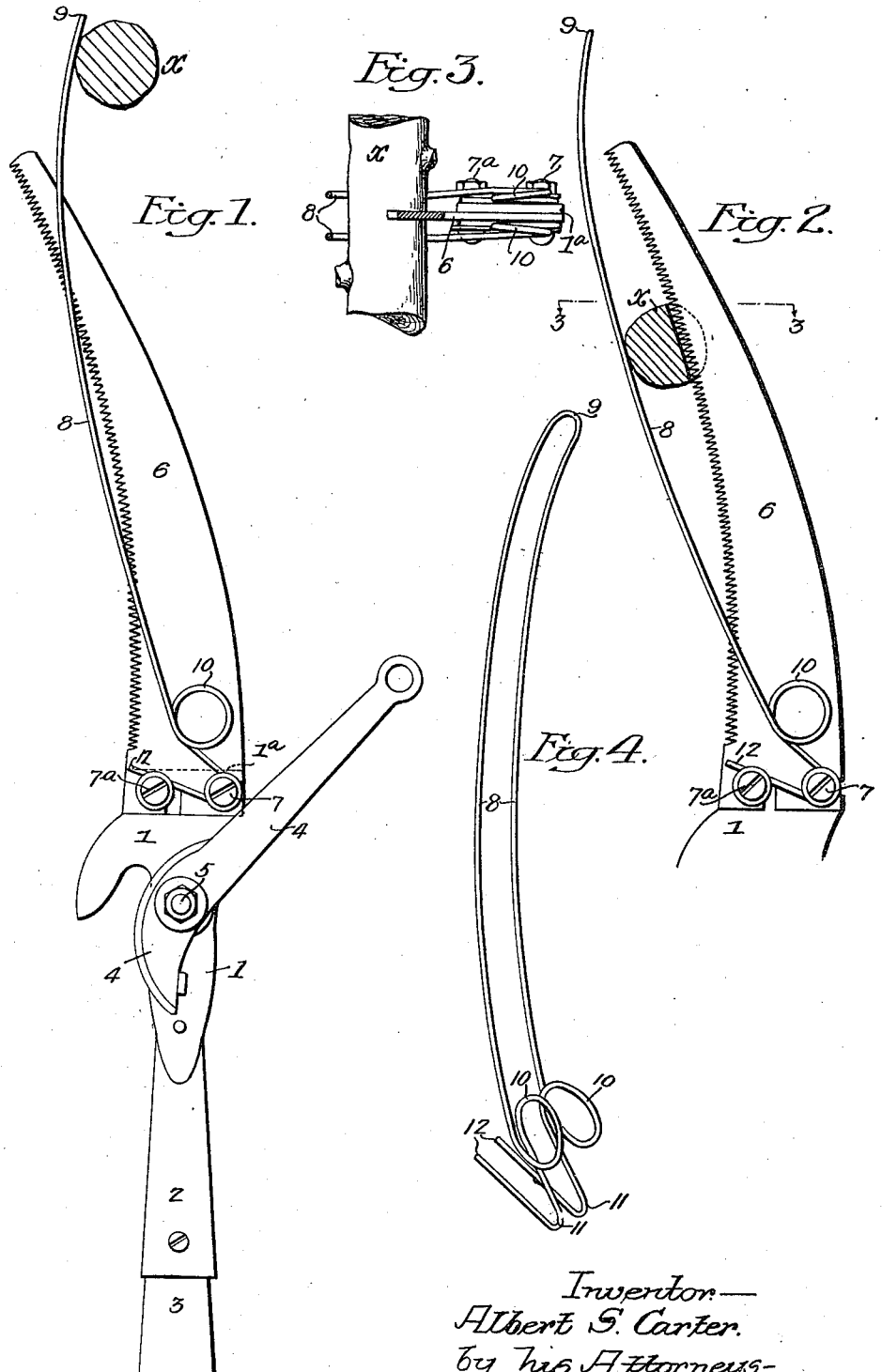

ALBERT S. CARTER, OF PHILADELPHIA, PENNSYLVANIA, ASSIGNOR TO HENRY DISSTON & SONS, INCORPORATED, OF PHILADELPHIA, PENNSYLVANIA, A CORPORATION OF PENNSYLVANIA.

PRUNING-SAW.

1,310,904.  Specification of Letters Patent.  Patented July 22, 1919.

Application filed September 5, 1917. Serial No. 189,755.

*To all whom it may concern:*

Be it known that I, ALBERT S. CARTER, a citizen of the United States, residing in Philadelphia, Pennsylvania, have invented certain Improvements in Pruning-Saws, of which the following is a specification.

One object of my invention is to provide a pruning saw with means for holding the saw to the limb of a tree, which will create enough pressure to allow the saw to cut a kerf properly without the operator exerting pressure.

A further object is to provide a guard for the saw so that it will not scar the branches of the tree when the saw is elevated to cutting position.

The invention is particularly adapted for use in pruning saws attached to long handles; the handle being reciprocated so as to make a cut and, under ordinary conditions, sufficient manual pressure must be exerted to feed the saw to the work.

In the accompanying drawing:—

Figure 1, is a side view of my improved pruning saw;

Fig. 2, is a diagrammatic side view showing the saw in the act of cutting a limb;

Fig. 3, is a sectional plan view on the line 3—3, Fig. 2; and

Fig. 4, is a detached perspective view of the attachment for holding the work to the saw.

Referring to the drawing, 1 is a pruning hook having a socket 2 for a handle 3. 4 is a blade pivoted at 5 and having an eye at its outer end to which a rope is attached. 6 is a saw, either curved as shown in Fig. 1, or straight as shown in Fig. 6, which is attached to an off-set portion 1ª of the pruning hook 1 which forms a support for the saw; the saw is secured to the projection by screws 7 and 7ª. This is a common form of pruning hook with saw attachment.

Heretofore, when the saw was used it was necessary to reciprocate the pruning saw and at the same time to force the saw against the limb and, in many cases, the limb would yield so that it was very difficult to saw the limb at the right place. Furthermore, it often happened that the limb was scarred in numerous places before the saw took the proper hold.

By my invention, I attach to the saw a presser arm 8 consisting, in the present instance, Fig. 1, of a heavy wire bent at 9 to form two arms, one on each side of the saw blade. Each end of the wire is coiled, as at 10, to form a spring and looped at 11 so as to engage the screw 7 and having an arm 12 to bear upon the screw 7ª, and the spring is so adjusted that the arm acts as a guard for the saw when not in use, as it prevents accidental contact with the main teeth of the saw. The end of the arm 8 extends beyond the end of the saw, as clearly shown in Fig. 1, so that by pressing the end of the arm against a limb $x$, as shown in Fig. 1, the arm can be forced out so as to allow the limb to enter the place between the arm and the saw, and by reciprocating the saw the limb $x$ can be cut, as illustrated in Fig. 2, the arm tending to force the limb with sufficient pressure against the teeth of the saw so that the saw will cut a kerf of the proper depth without binding.

By making the arm in two sections, one on each side of the saw, as in Fig. 3, the limb is held more firmly than where a single arm is used on one side of the blade only, but it will be understood that a single arm can be used without departing from the essential features of the invention.

While in Fig. 1, I have illustrated my invention used in connection with a handled pruning hook, it will be understood that in some instances, the saw may be simply mounted on the handle and the pruning hook dispensed with.

I claim:—

1. The combination in a pruning saw, of a saw blade; a support to which the blade it attached; a spring arm having a member at each side of the blade and secured to the support at the base of the blade, the arm extending beyond the blade so as to engage a limb and guide it into the space between the arm and the toothed edge of the blade.

2. The combination in a pruning saw, of a blade; a support to which the blade is attached; and a spring arm made of wire bent to form two members spaced apart, one located on one side of the blade and the other on the opposite side and extending beyond the end of the blade and each member having a loop at its inner end forming a spring member, said arm being secured to the blade support.

3. The combination in a pruning saw, of a support; a blade; two screws securing the blade to the support; an arm formed of wire bent at the outer end to form two members spaced apart, one located at one side of the saw blade and the other on the opposite side of the saw blade, the arm being curved longitudinally, the ends of the wires forming the arm engaging the screws by which the blade is attached to the head and each member of the arm being coiled to form a spring.

4. The combination in a pruning saw, of a curved blade; a support to which the blade is attached; a spring arm curved longitudinally in a direction opposite to that of the blade and having a member on each side of the saw blade, the two members being connected by a loop at a point beyond the end of the saw blade, the arm being smooth so that a limb can be selected by means of the arm and the saw moved into position without scarifying the limb.

In witness whereof I affix my signature.

ALBERT S. CARTER.

Copies of this patent may be obtained for five cents each, by addressing the "Commissioner of Patents, Washington, D. C."